(12) United States Patent
Wang et al.

(10) Patent No.: US 12,547,377 B2
(45) Date of Patent: Feb. 10, 2026

(54) DATA PROCESSING APPARATUS AND METHOD

(71) Applicant: HUAWEI TECHNOLOGIES CO., LTD., Shenzhen (CN)

(72) Inventors: Long Wang, Beijing (CN); Zongyan Cao, Shenzhen (CN); Baicheng Yan, Beijing (CN); Yibin Wang, Beijing (CN); Zhe Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 18/330,201

(22) Filed: Jun. 6, 2023

(65) Prior Publication Data

US 2023/0409289 A1 Dec. 21, 2023

Related U.S. Application Data

(63) Continuation of application No. PCT/CN2021/134043, filed on Nov. 29, 2021.

(30) Foreign Application Priority Data

Dec. 7, 2020 (CN) .......................... 202011437520.0
Mar. 17, 2021 (CN) .......................... 202110285243.4

(51) Int. Cl.
*G06F 9/44* (2018.01)
*G06F 8/30* (2018.01)
(Continued)

(52) U.S. Cl.
CPC .................. *G06F 8/30* (2013.01); *G06F 8/76* (2013.01); *G06F 8/443* (2013.01); *G06F 8/447* (2013.01)

(58) Field of Classification Search
CPC ... G06F 8/30; G06F 8/76; G06F 8/443; G06F 8/447
See application file for complete search history.

(56) References Cited

U.S. PATENT DOCUMENTS

2008/0250401 A1* 10/2008 Puri ........................ G06F 8/433
717/160
2017/0262567 A1 9/2017 Vassiliev
(Continued)

FOREIGN PATENT DOCUMENTS

| CN | 108345937 A | 7/2018 |
| CN | 110162335 A | 8/2019 |

(Continued)

OTHER PUBLICATIONS

Kevin J. Brown, A Heterogeneous Parallel Framework for Domain-Specific Languages, 2011, pp. 1-17. https://ieeexplore.ieee.org/stamp/stamp.jsp?tp=&arnumber=6113791 (Year: 2011).*

(Continued)

*Primary Examiner* — Mongbao Nguyen
(74) *Attorney, Agent, or Firm* — Leydig, Voit & Mayer, Ltd.

(57) ABSTRACT

A data processing apparatus and method performs multi-level IR decomposition on original application code, extract more abundant computation and data flow features to obtain an initial computational graph, and perform graph transformation processing on the initial computational graph to obtain a target computational graph, allowing an application corresponding to original application code to run in different systems and implement performance portability.

20 Claims, 10 Drawing Sheets

(51) Int. Cl.
  *G06F 8/76* (2018.01)
  *G06F 9/445* (2018.01)
  *G06F 9/45* (2006.01)
  *G06F 9/455* (2018.01)
  *G06F 8/41* (2018.01)

(56) References Cited

U.S. PATENT DOCUMENTS

| | | | |
|---|---|---|---|
| 2018/0203673 A1* | 7/2018 | Ravishankar | G06N 5/022 |
| 2019/0163449 A1 | 5/2019 | Hein et al. | |
| 2019/0391796 A1* | 12/2019 | Brady | G06F 8/458 |
| 2020/0225921 A1* | 7/2020 | Pelton | G06F 30/323 |
| 2020/0293838 A1* | 9/2020 | Li | G06F 18/2185 |
| 2020/0342286 A1* | 10/2020 | Zhang | G06F 9/5066 |
| 2020/0364036 A1* | 11/2020 | De Smet | G06F 8/427 |
| 2021/0096832 A1* | 4/2021 | Rich | G06F 40/154 |
| 2021/0248501 A1* | 8/2021 | Shin | G06N 5/042 |
| 2022/0067538 A1* | 3/2022 | Choudhary | G06F 8/433 |

FOREIGN PATENT DOCUMENTS

| | | |
|---|---|---|
| CN | 110377288 A | 10/2019 |
| CN | 110764744 A | 2/2020 |
| CN | 110766147 A | 2/2020 |
| CN | 110968321 A | 4/2020 |
| CN | 111443917 A | 7/2020 |
| CN | 111783100 A | 10/2020 |
| CN | 112015426 A | 12/2020 |
| WO | WO-2020236318 A1 * 11/2020 ............... G06F 8/47 |

OTHER PUBLICATIONS

Meena Belwal, Intermediate Representation for Heterogeneous Multi-Core: a Survey, 2015, pp. 1-6. https://ieeexplore.ieee.org/stamp/stamp.jsp?tp=&arnumber=7050496 (Year: 2011).*

Li et al., "The Deep Learning Compiler: a Comprehensive Survey," IEEE Transactions on Parallel and Distributed Systems, vol. 32, No. 3, XP011818767, Total 20 pages (Mar. 2021).

Ben-Nun et al., "Stateful Dataflow Multigraphs: a Data-Centric Model for Performance Portability on Heterogeneous Architectures," Proceedings of the International Conference for High Performance Computing, Networking, Storage and Analysis, total 18 pages (Aug. 30, 2019).

Ansel et al., "OpenTuner: an Extensible Framework for Program Autotuning," Proceedings of the 23rd International Conference on Parallel Architectures and Compilation, total 13 pages (Aug. 23-27, 2014).

Chen et al., "TVM: End-to-End Optimization Stack for Deep Learning," arXiv:1802.04799v1, total 19 pages (Feb. 12, 2018).

Roesch et al., "Relay: a High-Level Compiler for Deep Learning," arXiv:1904.08368v2, total 14 pages (Aug. 2019).

Linyang et al., "A deep learning compilation framework that optimizes both operations and data simultaneously," High Technology Letters, High Technology Communications, vol. 30, No. 2, 2020: 120-125, total 12 pages (Feb. 10, 2020). With an English translation.

* cited by examiner

DATA PROCESSING APPARATUS AND METHOD

CROSS-REFERENCE TO RELATED APPLICATIONS

This application is a continuation of International Application No. PCT/CN2021/134043, filed on Nov. 29, 2021, which claims priorities to Chinese Patent Application No. 202110285243.4, filed on Mar. 17, 2021 and Chinese Patent Application No. 202011437520.0 filed on Dec. 7, 2020. All of the aforementioned applications are hereby incorporated by reference in their entireties.

TECHNICAL FIELD

This application relates to the field of computers, and in particular, to a data processing apparatus and method.

BACKGROUND

Data movement is one of main factors that cause power consumption and application overheads of a current computation system. How to optimize data movement and maintain performance portability has always been a key and difficult part in computation system and application design. According to a data-centric (Data-Centric, DC) approach, a system and an application are designed by focusing on data movement and computation, which can effectively reduce system power consumption and improve application performance.

Currently, the academia and industry have carried out some research on the DC approach, and DC system design has become an important development trend in future. In a typical DC-based implementation method, original application code is converted into an intermediate representation (intermediate representation, IR), and a computational graph is constructed based on the IR. Then, the computational graph is transformed in a manner manually selected by a user, and then is further converted to obtain and output optimized target application code.

However, in the foregoing implementation, the user needs to deeply study graph transformation manners and master features and usage methods thereof. This is labor- and time-consuming. In addition, the user manually selects a computational graph transformation manner with reference to application optimization experience, resulting in low optimization efficiency.

Therefore, how to improve optimization efficiency of application tuning and maintain performance portability is a technical problem to be urgently resolved.

SUMMARY

Embodiments of this application provide a data processing apparatus and method, which allow an application corresponding to original application code to run in different systems and implement performance portability. This improves optimization effects and efficiency of an application tuning process, as compared with a manner in which a user performs manual selection for transformation.

A first aspect of embodiments of this application provides a data processing apparatus. The apparatus is used in a process of performing application tuning on original application code, allowing an application corresponding to the original application code to run in different systems and implement performance portability. First, an input module in the apparatus obtains the original application code, where the original application code is used as an input of a multi-level IR decomposition module in the apparatus. The multi-level IR decomposition module decomposes the original application code into a plurality of levels of IRs, and determines an initial computational graph based on the plurality of levels of IRs. Then, a transformation module in the apparatus performs graph transformation processing on the initial computational graph for at least once, where an obtained target computational graph is used as an input of a code generation module in the apparatus. The code generation module generates target application code based on the target computational graph. Finally, an output module in the apparatus outputs the target application code to a target device, so that an application corresponding to the target application code can run on the target device.

Based on the foregoing technical solution, multi-level IR decomposition is performed on the original application code, so that more abundant computation and data flow features are extracted to obtain the initial computational graph, and graph transformation processing is performed on the initial computational graph for at least once to obtain the target computational graph. That is, when auto-optimization is performed on the original application code based on DC, the application corresponding to the original application code is enabled to run in different systems and performance portability is implemented. This improves optimization effects and efficiency of the application tuning process, as compared with a manner in which a user performs manual selection for transformation.

In a possible implementation of the first aspect of embodiments of this application, the transformation module is specifically configured to: perform graph transformation processing on the initial computational graph for at least once, to obtain a graph-transformed computational graph, where the graph-transformed computational graph includes an original parameter; and then perform parameter transformation processing on the original parameter in code corresponding to the graph-transformed computational graph, to obtain the target computational graph.

Based on the foregoing technical solution, the transformation module in the data processing apparatus may transform the initial computational graph at different granularities to obtain the target computational graph, that is, after performing optimization at an optimization granularity of the computational graph to obtain a transformed computational graph, perform optimization at an optimization granularity of a parameter included in the transformed computational graph to obtain the target computational graph. The transformation module completes auto-optimization of the initial computational graph based on two tuning granularities, which can fully improve application performance and reduce system overheads.

In a possible implementation of the first aspect of embodiments of this application, the transformation module in the data processing apparatus is specifically configured to: perform, based on hardware information of the target device, parameter transformation processing on the original parameter in the code corresponding to the graph-transformed computational graph, to obtain the target computational graph.

Based on the foregoing technical solution, in a process in which the transformation module performs optimization at an optimization granularity of a parameter included in the graph-transformed computational graph, the transformation module may specifically perform, based on the hardware information of the target device, parameter transformation processing on the original parameter in the code corresponding to the graph-transformed computational graph, to obtain the target computational graph. The original parameter is optimized based on the hardware information of the target device to obtain a target parameter. The hardware information of the target device may indicate a hardware running environment of the target device, so that the constructed transformed computational graph matches the hardware running environment of the target device, thereby further improving optimization effects.

In a possible implementation of the first aspect of embodiments of this application, the multi-level IR decomposition module in the data processing apparatus includes a first-level IR decomposition module, a second-level IR decomposition module, and a third-level IR decomposition module. The first-level IR decomposition module is configured to determine a first IR based on the original application code. The first IR includes a plurality of operators. The second-level IR decomposition module is configured to construct a second IR based on the first IR. The second IR includes a structured pattern corresponding to the plurality of operators. The third-level IR decomposition module is configured to determine, based on the second IR, a DC primitive corresponding to the structured pattern. The DC primitive is used to construct the initial computational graph.

Based on the foregoing technical solution, in a process in which the multi-level IR decomposition module performs IR decomposition on the original application code to obtain the initial computational graph, specifically, the first IR decomposition module may obtain the first IR including the plurality of operators, the second IR decomposition module may obtain the second IR including the structured pattern corresponding to the plurality of operators, and then the third IR decomposition module may obtain the DC primitive that is corresponding to the structured pattern and that is used to construct the initial computational graph. Compared with a manner of extracting a single level of IR from the original application code, more abundant computation and data flow features can be extracted from the initial computational graph obtained by performing multi-level IR decomposition on the original application code.

In a possible implementation of the first aspect of embodiments of this application, the second IR decomposition module in the data processing apparatus is specifically configured to construct the second IR based on the first IR and the hardware information of the target device.

Based on the foregoing technical solution, in a process of performing IR decomposition on the first IR to construct the second IR including the structured pattern corresponding to the plurality of operators, the second IR decomposition module may construct the second IR based on the hardware information of the target device. The hardware information of the target device may indicate the hardware running environment of the target device, so that the constructed second IR matches the hardware running environment of the target device, thereby further improving optimization effects.

In a possible implementation of the first aspect of embodiments of this application, the transformation module in the data processing apparatus is specifically configured to: first, decompose the initial computational graph to obtain a plurality of subgraphs; and then perform graph transformation processing on the plurality of subgraphs based on a preset subgraph transformation library for at least once, to obtain the target computational graph.

Based on the foregoing technical solution, in a process of performing graph transformation processing on the initial computational graph for at least once to obtain the target computational graph, the transformation module may specifically decompose the initial computational graph to obtain the plurality of subgraphs, and perform iterative optimization on the initial computational graph at a fine optimization granularity of subgraphs for a plurality of times, to obtain the target computational graph. This can further improve optimization effects compared with a manner of performing optimization at an optimization granularity of a computational graph.

In a possible implementation of the first aspect of embodiments of this application, the transformation module in the data processing apparatus is specifically configured to: perform graph transformation processing on the plurality of subgraphs based on the preset subgraph transformation library and a first parameter for at least once, to obtain the target computational graph. The first parameter includes at least one of the following: a quantity of transformation times, a transformation duration, data movement overheads, and a cache miss rate.

Based on the foregoing technical solution, in a process of performing graph transformation on the subgraphs, the transformation module may perform iterative optimization for a plurality of times as indicated by the first parameter, and different optimization requirements may be determined based on the first parameter, that is, optimization is implemented as required when the transformation module performs graph transformation on the subgraphs, thereby further improving automation of the optimization process.

In a possible implementation of the first aspect of embodiments of this application, the input module in the data processing apparatus is further configured to obtain subgraph transformation update information. The apparatus further includes: an update module, configured to update the preset subgraph transformation library based on the subgraph transformation update information.

Based on the foregoing technical solution, the preset subgraph transformation library used by the transformation module may be updated based on the subgraph transformation update information, that is, the subgraph transformation library may be updated based on expertise or a user-defined configuration.

In a possible implementation of the first aspect of embodiments of this application, the original application code includes at least one of the following: a mathematical equation operator, geometric discrete abstraction, a typical data structure, and a DC primitive.

Based on the foregoing technical solution, the original application code may include the plurality of implementations. To support computing applications in a wide range of fields, facilitate application compilation for users, and improve programming efficiency, a DSL interface that is highly abstract and close to mathematical expressions is designed and provided by analyzing and summarizing common mathematical operators and data structures in a wide range of computing fields. That is, the original application code includes at least one of the following: a mathematical equation operator (for example, an n-order differential equation, a matrix operation, LU decomposition, or a convolution operation), geometric discrete abstraction, a typical data structure (for example, a vector, a two-dimensional matrix, an n-dimensional matrix, a tree, or a linked list), a DC primitive, and the like. In addition, the input module in the data processing apparatus further supports users in customizing and extending the domain-specific language (domain-specific language, DSL) interface, to improve adaptability of the solution.

In a possible implementation of the first aspect of embodiments of this application, the operator includes at least one of the following: mathematical equation-based operator decomposition, geometric discrete abstraction, and a basic data type.

Based on the foregoing technical solution, the operators obtained by the first IR decomposition module by performing IR decomposition on the original application code may include the plurality of implementations, that is, the first IR decomposition module obtains related mathematical and data information of the application by scanning a keyword and key information in the original application code, to determine the first IR including operators in the plurality of implementations.

In a possible implementation of the first aspect of embodiments of this application, the structured pattern includes at least one of the following: a Stencil pattern, a Reduce pattern, and a Package pattern.

Based on the foregoing technical solution, the second IR decomposition module further constructs the second IR based on the first IR. The structured pattern included in the second IR may include the plurality of implementations, that is, the second IR decomposition module may perform construction based on the first IR including the plurality of operators, to obtain a plurality of different structured patterns.

In a possible implementation of the first aspect of embodiments of this application, the initial computational graph includes at least one of the following: data, data movement, a computation task, and loop mapping.

Based on the foregoing technical solution, the third IR decomposition module determines, based on the second IR, the DC primitive corresponding to the structured pattern. The initial computational graph constructed based on the DC primitive may include a data-centric primitive representation such as data, data movement, a computation task, and loop mapping, so that the initial computational graph is adapted to a DC-based application tuning solution.

A second aspect of embodiments of this application provides a data processing method. The method may be applied to a process of performing application tuning on original application code, allowing an application corresponding to the original application code to run in different systems and implement performance portability. In the method, first, the original application code is obtained. Then, the original application code is decomposed into a plurality of levels of IRs, and an initial computational graph is determined based on the plurality of levels of IRs. After graph transformation processing is performed on the initial computational graph for at least once to obtain a target computational graph, target application code is generated based on the target computational graph. Finally, the target application code is output to a target device.

Based on the foregoing technical solution, multi-level IR decomposition is performed on the original application code, so that more abundant computation and data flow features are extracted to obtain the initial computational graph, and graph transformation processing is performed on the initial computational graph for at least once to obtain the target computational graph. That is, when auto-optimization is performed on the original application code based on DC, the application corresponding to the original application code is enabled to run in different systems and performance portability is implemented. This improves optimization effects and efficiency of the application tuning process, as compared with a manner in which a user performs manual selection for transformation.

In a possible implementation of the second aspect of embodiments of this application, a process of performing graph transformation processing on the initial computational graph for at least once to obtain a target computational graph may specifically include: performing graph transformation processing on the initial computational graph for at least once, to obtain a graph-transformed computational graph, where the graph-transformed computational graph includes an original parameter; and performing parameter transformation processing on the original parameter in code corresponding to the graph-transformed computational graph, to obtain the target computational graph.

Based on the foregoing technical solution, the initial computational graph is transformed at different granularities to obtain the target computational graph, that is, after optimization is performed at an optimization granularity of the computational graph to obtain a transformed computational graph, optimization is performed at an optimization granularity of a parameter included in the transformed computational graph to obtain the target computational graph. Auto-optimization of the initial computational graph is completed based on two tuning granularities, which can fully improve application performance and reduce system overheads.

In a possible implementation of the second aspect of embodiments of this application, a process of performing parameter transformation processing on the original parameter in code corresponding to the graph-transformed computational graph, to obtain the target computational graph may specifically include: performing, based on hardware information of the target device, parameter transformation processing on the original parameter in the code corresponding to the graph-transformed computational graph, to obtain the target computational graph.

Based on the foregoing technical solution, when optimization is performed at an optimization granularity of a parameter included in the graph-transformed computational graph, parameter transformation processing may be specifically performed, based on hardware information of the target device, on the original parameter in the code corresponding to the graph-transformed computational graph, to obtain the target computational graph. The original parameter is optimized based on the hardware information of the target device to obtain a target parameter. The hardware information of the target device may indicate a hardware running environment of the target device, so that the constructed transformed computational graph matches the hardware running environment of the target device, thereby further improving optimization effects.

In a possible implementation of the second aspect of embodiments of this application, the decomposing the original application code into a plurality of levels of IRs includes: determining a first IR based on the original application code, where the first IR includes a plurality of operators; then, constructing a second IR based on the first IR, where the second IR includes a structured pattern corresponding to the plurality of operators; and further, determining, based on the second IR, a DC primitive corresponding to the structured pattern, where the DC primitive is used to construct the initial computational graph.

Based on the foregoing technical solution, when multi-level IR decomposition is performed on the original application code to obtain the initial computational graph, specifically, the first IR including the plurality of operators, the second IR including the structured pattern corresponding to the plurality of operators, and the DC primitive that is corresponding to the structured pattern and that is used to construct the initial computational graph may be obtained. Compared with a manner of extracting a single level of IR from the original application code, more abundant computation and data flow features can be extracted from the initial computational graph obtained by performing multi-level IR decomposition on the original application code.

In a possible implementation of the second aspect of embodiments of this application, the constructing a second IR based on the first IR includes: constructing the second IR based on the first IR and the hardware information of the target device.

Based on the foregoing technical solution, when IR decomposition is performed on the first IR to construct the second IR including the structured pattern corresponding to the plurality of operators, the second IR may be constructed based on the hardware information of the target device. The hardware information of the target device may indicate the hardware running environment of the target device, so that the constructed second IR matches the hardware running environment of the target device, thereby further improving optimization effects.

In a possible implementation of the second aspect of embodiments of this application, a process of performing graph transformation processing on the initial computational graph for at least once to obtain a target computational graph may include: decomposing the initial computational graph to obtain a plurality of subgraphs; and then, performing graph transformation processing on the plurality of subgraphs based on a preset subgraph transformation library for at least once, to obtain the target computational graph.

Based on the foregoing technical solution, when graph transformation processing is performed on the initial computational graph for at least once to obtain the target computational graph, the initial computational graph may be specifically decomposed to obtain the plurality of subgraphs, and iterative optimization is performed on the initial computational graph at a fine optimization granularity of subgraphs for a plurality of times, to obtain the target computational graph. This can further improve optimization effects compared with a manner of performing optimization at an optimization granularity of a computational graph.

In a possible implementation of the second aspect of embodiments of this application, the performing graph transformation processing on the plurality of subgraphs based on a preset subgraph transformation library for at least once, to obtain the target computational graph includes: performing graph transformation processing on the plurality of subgraphs based on the preset subgraph transformation library and a first parameter for at least once, to obtain the target computational graph. The first parameter includes at least one of the following: a quantity of transformation times, a transformation duration, data movement overheads, and a cache miss rate.

Based on the foregoing technical solution, when graph transformation is performed on the subgraphs, iterative optimization may be performed for a plurality of times as indicated by the first parameter, and different optimization requirements may be determined based on the first parameter, that is, optimization is implemented as required when the transformation module performs graph transformation on the subgraphs, thereby further improving automation of the optimization process.

In a possible implementation of the second aspect of embodiments of this application, the method further includes: obtaining subgraph transformation update information; and updating the preset subgraph transformation library based on the subgraph transformation update information.

Based on the foregoing technical solution, the preset subgraph transformation library used in the subgraph transformation process may be updated based on the subgraph transformation update information, that is, the subgraph transformation library may be updated based on expertise or a user-defined configuration.

In a possible implementation of the second aspect of embodiments of this application, the original application code includes at least one of the following: a mathematical equation operator, geometric discrete abstraction, a typical data structure, and a DC primitive.

Based on the foregoing technical solution, the original application code may include the plurality of implementations. To support computing applications in a wide range of fields, facilitate application compilation for users, and improve programming efficiency, a DSL interface that is highly abstract and close to mathematical expressions is designed and provided by analyzing and summarizing common mathematical operators and data structures in a wide range of computing fields. That is, the original application code includes at least one of the following: a mathematical equation operator (for example, an n-order differential equation, a matrix operation, LU decomposition, or a convolution operation), geometric discrete abstraction, a typical data structure (for example, a data structure such as a vector, a two-dimensional matrix, an n-dimensional matrix, a tree, or a linked list), a DC primitive, and the like. In addition, the input module in the data processing apparatus further supports users in customizing and extending the domain-specific language (domain-specific language, DSL) interface, to improve adaptability of the solution.

In a possible implementation of the second aspect of embodiments of this application, the operator includes at least one of the following: mathematical equation-based operator decomposition, geometric discrete abstraction, and a basic data type.

Based on the foregoing technical solution, the operator obtained by performing IR decomposition on the original application code may include the plurality of implementations, that is, related mathematical and data information of the application is obtained by scanning a keyword and key information in the original application code, to determine the first IR including operators in the plurality of implementations.

In a possible implementation of the second aspect of embodiments of this application, the structured pattern includes at least one of the following: a Stencil pattern, a Reduce pattern, and a Package pattern.

Based on the foregoing technical solution, the second IR may be further constructed based on the first IR. The structured pattern included in the second IR may include the plurality of implementations, that is, construction may be performed by using the first IR including the plurality of operators, to obtain a plurality of different structured patterns.

In a possible implementation of the second aspect of embodiments of this application, the first DC computational graph includes at least one of the following: data, data movement, a computation task, and loop mapping.

Based on the foregoing technical solution, the DC primitive corresponding to the structured pattern may be determined based on the second IR. The initial computational graph constructed by using the DC primitive may include a data-centric primitive representation such as data, data movement, a computation task, and loop mapping, so that the initial computational graph is adapted to a DC-based application tuning solution.

A third aspect of embodiments of this application provides a data processing apparatus, including a processor. The processor is coupled to a memory, the memory is configured to store a computer program or instructions, and the processor is configured to execute the computer program or the instructions in the memory, to enable the data processing apparatus to implement the method according to any one of the second aspect or the possible implementations of the second aspect.

A fourth aspect of embodiments of this application provides a computer-readable storage medium storing one or more computer-executable instructions. When the computer-executable instructions are executed by a processor, the processor performs the method according to any one of the second aspect or the possible implementations of the second aspect.

A fifth aspect of embodiments of this application provides a computer program product storing one or more computers. When the computer program product is executed by a processor, the processor performs the method according to any one of the second aspect or the possible implementations of the second aspect.

A sixth aspect of embodiments of this application provides a chip system. The chip system includes at least one processor, configured to support a data processing apparatus in implementing a function in any one of the second aspect or the possible implementations of the second aspect.

In a possible design, the chip system may further include a memory. The memory is configured to store program instructions and data that are necessary for the data processing apparatus. The chip system may include a chip, or may include a chip and another discrete component. Optionally, the chip system further includes an interface circuit, and the interface circuit provides program instructions and/or data for the at least one processor.

For technical effects brought by any one of the second aspect to the sixth aspect or the possible implementations of the second aspect to the sixth aspect, refer to the technical effects brought by the first aspect or different possible implementations of the first aspect. Details are not described herein again.

It can be learned from the foregoing technical solutions that embodiments of this application have the following advantages: In the data processing apparatus, the input module first obtains original application code, where the original application code is used as an input of the multi-level IR decomposition module in the apparatus. The multi-level IR decomposition module decomposes the original application code into a plurality of levels of IRs, and determines an initial computational graph based on the plurality of levels of IRs. Then, the transformation module in the apparatus performs graph transformation processing on the initial computational graph for at least once, where an obtained target computational graph is used as an input of the code generation module in the apparatus. The code generation module generates target application code based on the target computational graph. Finally, the output module in the apparatus outputs the target application code to a target device, so that an application corresponding to the target application code can run on the target device. Multi-level IR decomposition is performed on the original application code, so that more abundant computation and data flow features are extracted to obtain the initial computational graph, and graph transformation processing is performed on the initial computational graph for at least once to obtain the target computational graph. That is, when auto-optimization is performed on the original application code based on DC, an application corresponding to the original application code is enabled to run in different systems and performance portability is implemented. This improves optimization effects and efficiency of an application tuning process, as compared with a manner in which a user performs manual selection for transformation.

DESCRIPTION OF EMBODIMENTS

Figure 1:
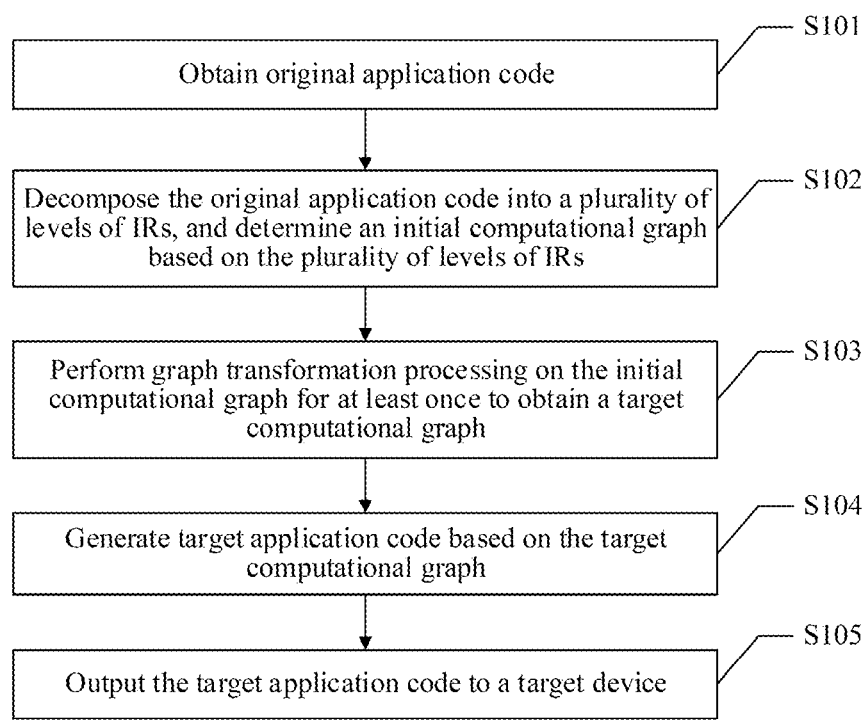
FIG. 1 is a schematic diagram of a data processing method according to an embodiment of this application.

The following describes technical solutions in embodiments of this application with reference to accompanying drawings in embodiments of this application. It is clear that the described embodiments are merely some rather than all embodiments of this application. All other embodiments obtained by persons of ordinary skill in the art based on embodiments of this application without creative efforts shall fall within the protection scope of this application.

First, some terms in embodiments of this application are explained and described, to facilitate understanding of persons skilled in the art.

Application (application): a program or a collection of programs developed for users.

Computation system (computation system): a computer system that executes applications.

Data-centric (Data-Centric, DC): an approach about having focus on data transmission and computation.

Domain-specific architecture (domain-specific architecture, DSA): an architecture specific to a specific domain.

Intermediate representation (intermediate representation, IR): a representation between target program code and source code, which is independent of a hardware system and can describe source code information.

Domain-specific language (domain-specific language, DSL): a language that abstracts operations and concepts in a specific domain.

Data flow (Data Flow): data transferring between different computation tasks in an application.

Data-centric computational graph (Data-Centric Computation Graph): a multi-graph structure for representing a computation task and a data flow process of an application.

Graph transformation (Graph Transformation): processing that keeps an application output result unchanged but changes an application computational graph structure, for example, changing a nesting sequence of a double for loop.

Data movement is one of main factors that cause power consumption and application overheads of a current computation system. How to optimize data movement and maintain performance portability has always been a key and difficult part in computation system and application design. According to the data-centric (Data-Centric, DC) approach, a system and an application are designed by focusing on data movement and computation, which can effectively reduce system power consumption and improve application performance. Currently, the academia and industry have carried out some research on the DC approach, and DC system design has become an important development trend in the future. Currently, a program corresponding to a source language may be optimized while an application is tuned, to improve running efficiency of a program corresponding to a target language.

In an implementation of a conventional application tuning method, DSL application code that is input is converted first. To be specific, a DC computational graph is directly obtained through single-level IR decomposition, an available subgraph transformation manner is searched for, and whether an available graph transformation exists is determined manually.

If an available graph transformation manner exists, the available graph transformation manner is provided for a user to select, and the computational graph is transformed in a graph transformation manner manually selected by the user.

If no available graph transformation manner exists, the current computational graph is converted into target code and the target code is output.

In this implementation method, the user needs to deeply study graph transformation manners and master features and usage methods thereof. This is labor- and time-consuming. In addition, the user manually selects a computational graph transformation manner with reference to application optimization experience, resulting in low optimization efficiency.

Therefore, how to improve optimization efficiency of an application tuning process and maintain performance portability is a technical problem that needs to be urgently resolved. A core problem to be resolved by this application is: for DC auto-optimization in a wide range of computing fields, how to run original application code in different systems to implement performance portability, and perform performance optimization based on different systems to improve application performance.

Therefore, embodiments of this application provide a data processing apparatus and method, to perform multi-level IR decomposition on original application code, so that more abundant computation and data flow features are extracted to obtain an initial computational graph, and perform graph transformation processing and parameter transformation processing on the initial computational graph to obtain a target computational graph, to enable an application corresponding to original application code to run in different systems and implement performance portability. This improves optimization effects and efficiency of an application tuning process, as compared with a manner in which a user performs manual selection for transformation. The following describes embodiments of this application in detail with reference to accompanying drawings.

FIG. 1 is a schematic diagram of a data processing method according to an embodiment of this application. The method includes the following steps.

S101. Obtain original application code.

In this embodiment, when executing a compilation task, a data processing apparatus obtains, in step S101, original application code that is of a to-be-optimized application and that is used for compilation.

Specifically, the data processing apparatus may be a device such as a server, a data center, a mobile or user device, or a network component, or may be some execution modules in the device such as a server, a data center, a mobile or user device, or a network component.

Figure 2:
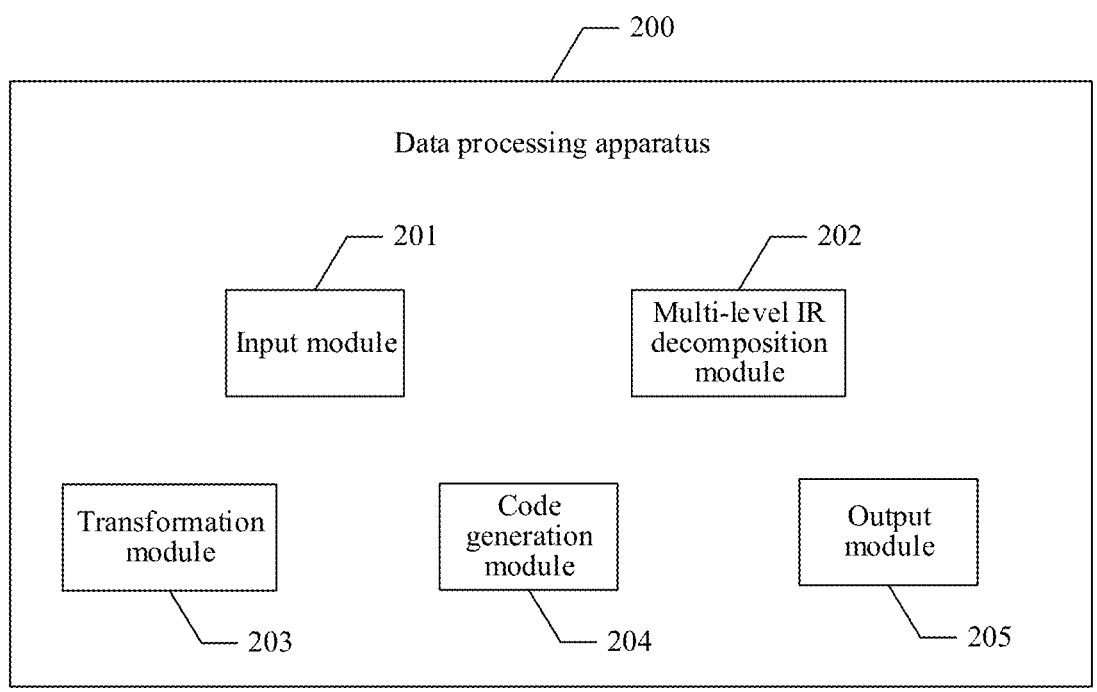
FIG. 2 is a schematic diagram of a data processing apparatus according to an embodiment of this application.

In addition, an implementation example of the data processing apparatus may be represented by FIG. 2. As shown in FIG. 2, the data processing apparatus 200 may include at least an input module 201, a multi-level IR decomposition module 202, a transformation module 203, a code generation module 204, and an output module 205. In step S101, the input module 201 in the data processing apparatus 200 may be used to obtain the original application code. Because the input module 201 may obtain the original application code based on a DSL, the input module may also be represented as a DSL interface module.

In a possible implementation, the to-be-optimized application may include a high-performance computing (high-performance computing, HPC) application, a cloud computing application, an AI application, and other applications in a wide range of computing fields. In addition, the original application code may also be represented as DSL code of an original application. Specifically, the original application code may include at least one of the following: a mathematical equation operator, geometric discrete abstraction, a typical data structure, and a DC primitive.

Specifically, to support computing applications in a wide range of fields, facilitate application compilation for users, and improve programming efficiency, in this embodiment, a DSL interface that is highly abstract and close to mathematical expressions is designed and provided by analyzing and summarizing common mathematical operators and data structures in a wide range of computing fields, including: a mathematical equation operator (for example, an n-order differential equation, a matrix operation, LU decomposition, or a convolution operation), geometric discrete abstraction, a typical data structure (for example, a vector, a two-dimensional matrix, an n-dimensional matrix, a tree, or a linked list), and a DC primitive. In addition, in this embodiment, the user is further supported in customizing and extending the DSL interface.

Further, when performing step S101, in addition to the original application code, the data processing apparatus may further obtain target hardware information. The target hardware information indicates hardware information of a target device on which target application code obtained through compilation by using the original application code is run. Therefore, in a subsequent optimization process, targeted optimization may be performed with reference to the target hardware information, to improve optimization effects.

For example, the target hardware information may include at least one of a central processing unit (central processing unit, CPU) core quantity, a CPU frequency, a capacity of each level of cache (cache), a vectorization length, a memory size, a GPU memory capacity, and the like of the target device.

S102. Decompose the original application code into a plurality of levels of IRs, and determine an initial computational graph based on the plurality of levels of IRs.

In this embodiment, the data processing apparatus decomposes the original application code obtained in step S101 to obtain the plurality of levels of IRs, and determines the initial computational graph based on the plurality of levels of IRs. The initial computational graph may be a DC-based computational graph.

In step S102, the multi-level IR decomposition module 202 in the data processing apparatus 200 shown in FIG. 2 may be used to perform multi-level IP decomposition on the original application code obtained by the input module 201 to obtain the plurality of levels of IRs, and determine the initial computational graph based on the plurality of levels of IRs.

Specifically, in step S102, the data processing apparatus may first perform multi-level IR decomposition to obtain a first level of IR, then obtain a next level of IR based on the first level of IR, and so on, to obtain the plurality of levels of IRs; and further determine the initial computational graph based on the plurality of levels of IRs. Compared with extracting a single level of IR in a conventional application tuning method, in step S102, multi-level IR decomposition is performed on the original application code, so that more abundant computation and data flow features are extracted to obtain the initial computational graph.

Figure 3:
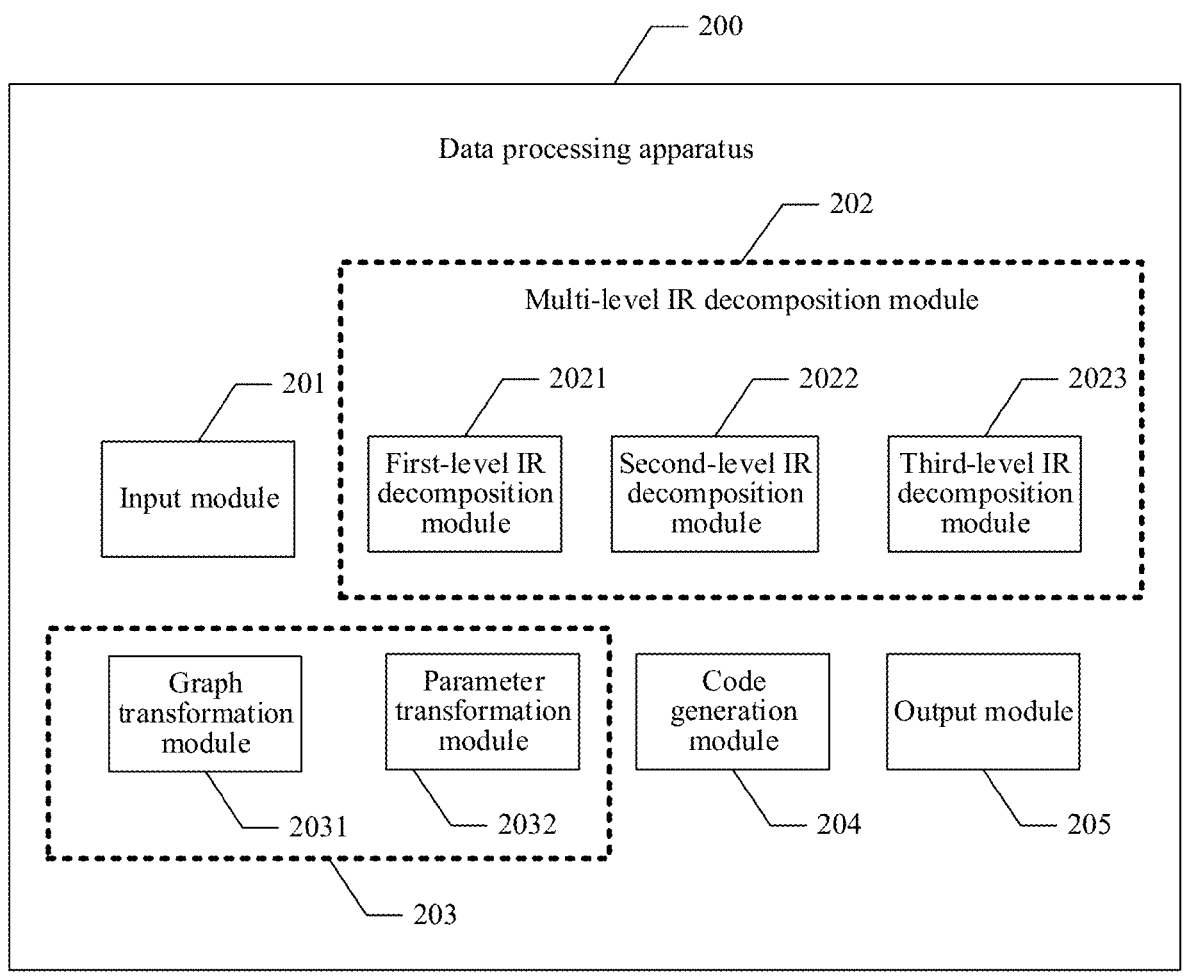
FIG. 3 is another schematic diagram of a data processing apparatus according to an embodiment of this application.

For example, the following uses an example in which a quantity of levels of the plurality of levels of IRs is three for description. Refer to FIG. 3. The multi-level IR decomposition module 202 shown in FIG. 2 includes at least a first-level IR decomposition module 2021, a second-level IR decomposition module 2022, and a third-level IR decomposition module 2023. The first-level IR decomposition module 2021 is configured to determine a first IR based on the original application code. The first IR includes a plurality of operators. The second-level IR decomposition module 2022 is configured to construct a second IR based on the first IR. The second IR includes a structured pattern corresponding to the plurality of operators. The third-level IR decomposition module 2023 is configured to determine, based on the second IR, a DC primitive corresponding to the structured pattern. The DC primitive is used to construct the initial computational graph. Compared with a manner of extracting a single level of IR from the original application code, more abundant computation and data flow features can be extracted from the initial computational graph obtained by performing multi-level IR decomposition on the original application code.

The first-level IR decomposition module 2021 shown in FIG. 3 is configured to determine, based on the original application code obtained in step S101, the first IR corresponding to the original application code. The first IR includes the plurality of operators.

Specifically, an input of the first-level IR decomposition module 2021 is the original application code (or referred to as the DSL code of the original application), and an output is the first IR including operators such as a mathematical equation and a data structure. The first IR includes operator decomposition based on a mathematical equation, geometric discrete abstraction (for example, a grid computing manner and classification), a basic data type, and the like. The first-level IR decomposition module 2021 may obtain related mathematical and data information of the application by scanning a keyword and key information in the DSL code of the original application, to determine the first IR including the operators. The operators determined by the first-level IR decomposition module 2021 may be from at least one of the following: mathematical equation-based operator decomposition, geometric discrete abstraction, and a basic data type in the original application code. Because the first IR obtained by the first-level IR decomposition module 2021 includes the operators, the first-level IR decomposition module 2021 may also be represented as an operator level module.

The second-level IR decomposition module 2022 shown in FIG. 3 is configured to further construct the second IR based on the first IR determined by the first-level IR decomposition module 2021. The second IR includes the structured pattern corresponding to the plurality of operators in the first IR.

Specifically, an input of the second-level IR decomposition module 2022 is the first IR including the operators, and an output is the second IR including an optimal structured pattern corresponding to the operators in the first IR. For example, the second IR may include a representation of a typical structured pattern such as a Stencil pattern, a Reduce pattern, or a Package pattern. The second-level IR decomposition module 2022 may establish a correspondence between an operator and a structured pattern with reference to expert experience, and automatically select an optimal structured pattern. Because the second IR obtained by the second-level IR decomposition module 2022 includes the structured pattern, the second-level IR decomposition module 2022 may also be represented as a structured pattern level module.

In a possible implementation, a basis for the second-level IR decomposition module 2022 to construct the second IR may further include the hardware information of the target device, in addition to the first IR. In other words, the second IR is constructed based on the first IR and the hardware information of the target device. As described in step S101, the target hardware information indicates the hardware information of the target device, so that the second IR constructed by the second-level IR decomposition module 2022 matches a hardware running environment of the target device, thereby improving optimization effects.

The third-level IR decomposition module 2023 shown in FIG. 3 is configured to determine, based on the second IR constructed by the second-level IR decomposition module 2022, the DC primitive corresponding to the structured pattern. The DC primitive is used to construct the initial computational graph.

Specifically, an input of the third-level IR decomposition module 2023 is the second IR including the structured pattern, an output is the DC primitive corresponding to the structured pattern in the second IR, and the DC primitive is used to construct the initial computational graph. For example, the third IR may include a data-centric primitive representation such as data, data movement, a computation task, and loop mapping. The third-level IR decomposition module 2023 further establishes a conversion library between a structured pattern and a DC primitive with reference to expert experience, directly provides an IR representation, and converts the IR representation into a DC computational graph. It should be noted that the third-level IR decomposition module 2023 may support the user in customizing and supplementing IR representations provided by various levels. In addition, different from a conventional application tuning method, the expert experience referred to in the foregoing content may be provided by a non-user. Because the third IR obtained by the third-level IR decomposition module 2023 includes the DC computational graph, the third-level IR decomposition module 2023 may also be represented as a DC primitive level module.

Figure 4:
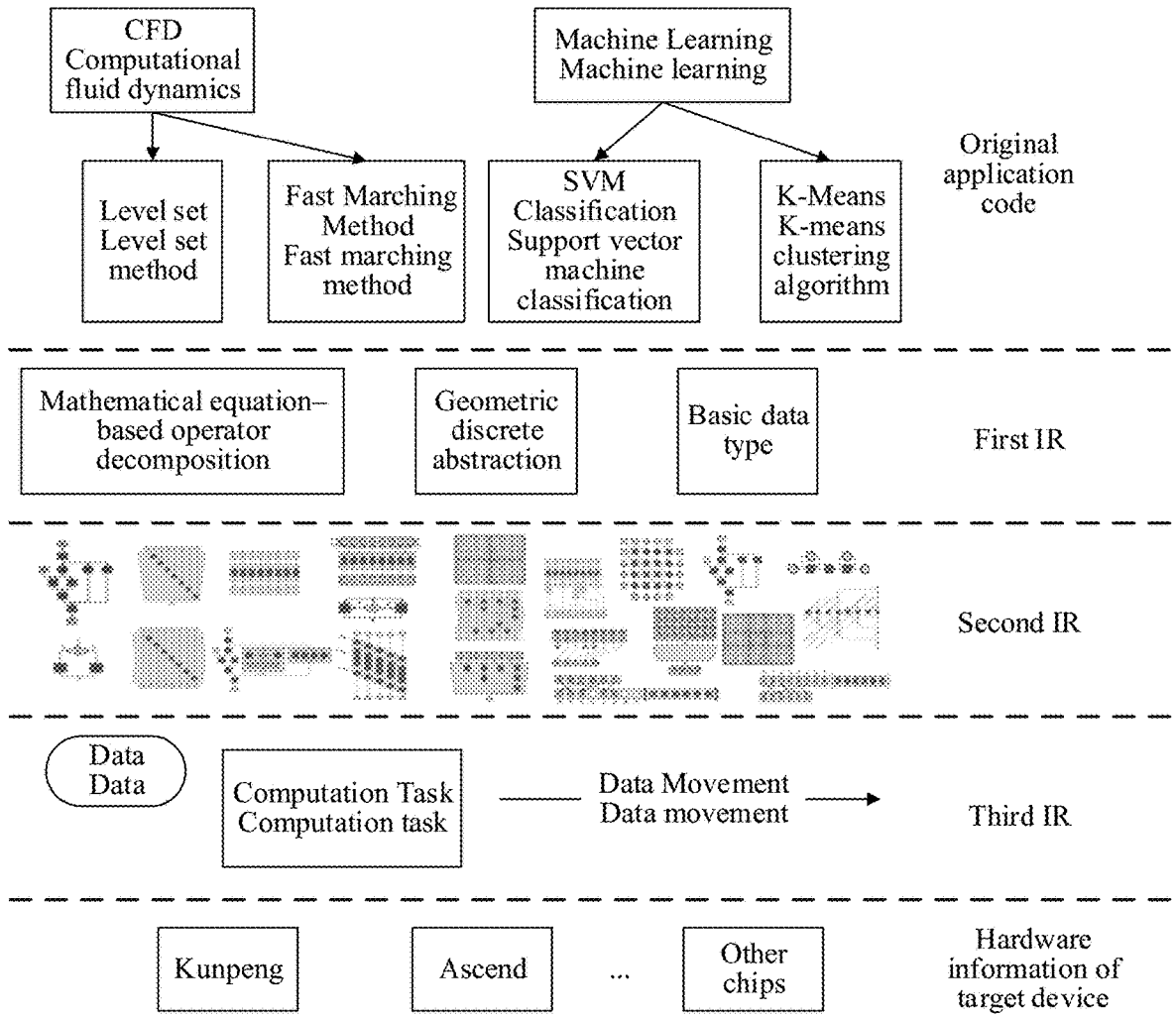
FIG. 4 is another schematic diagram of a data processing method according to an embodiment of this application.

For example, FIG. 4 is a schematic diagram of a level relationship designed in this embodiment from a computing application to an optimization implementation.

In FIG. 4, the original application code input to the first-level IR decomposition module 2021 includes a plurality of mathematical equations corresponding to the computing application. For example, when the computing application is computational fluid power (computational fluid dynamics, CFD), corresponding mathematical equations include at least a level set method (Level Set), fast marching method, and the like. When the computing application is machine learning (Machine Learning), corresponding mathematical equations include at least support vector machine classification (support vector machine Classification, SVM Classification) and a k-means clustering algorithm (k-means clustering, or K-Means for short). A correspondence between different applications and a plurality of mathematical equations is represented by arrows shown in FIG. 4. It is clear that the original application code may alternatively be implemented by using another application. This is not limited herein.

An operator level IR (that is, the first IR) obtained by the first-level IR decomposition module 2021 through decomposition includes: operator decomposition based on a mathematical equation, geometric discrete abstraction (for example, a grid computing manner and classification), a basic data type, and the like. A structured pattern level IR (that is, the second IR) obtained by the second-level IR decomposition module 2022 through decomposition includes one or more of a plurality of structured patterns shown in FIG. 4. A DC primitive level IR (that is, the third IR) used to construct an initial computational graph includes a data-centric primitive representation such as data (data), data movement (Data Movement), and a computation task (Computation Task). Further, the hardware information of the target device may be represented by an optimization implementation level in FIG. 4. The target hardware information indicates a hardware parameter of the target device, for example, indicates that a chip used in the target device is Kunpeng, Ascend, or another chip.

In this embodiment, as proposed in step S102, the multi-level IR decomposition module 202 performs multi-level decomposition to obtain a plurality of levels of computation IRs, so that an algorithm is separated from optimization, and more abundant computation and data flow features can be extracted, to obtain normalized, concise, and preliminarily optimized IRs. In this embodiment, the computing application is parsed into the first IR corresponding to the operator pattern level module, the second IR corresponding to the structured pattern level module, and the third IR corresponding to the DC primitive level module in sequence, and this idea is embedded in DSL design, so that more abundant computation and data flow features can be captured for auto-optimization in a subsequent step by scanning and analyzing the DSL code of the original application.

S103. Perform graph transformation processing on the initial computational graph for at least once to obtain a target computational graph.

In this embodiment, in step S103, the data processing apparatus performs, for at least once, graph transformation processing on the initial computational graph determined in step S102, that is, performs graph transformation optimization on the initial computational graph, to obtain the target computational graph.

In step S103, the transformation module 203 in the data processing apparatus 200 shown in FIG. 2 may be used to perform, for at least once, graph transformation processing on the initial computational graph determined by the multi-level IR decomposition module 202, to obtain the target computational graph.

In a possible implementation, in step S103, a process of performing graph transformation processing on the initial computational graph for at least once to obtain a target computational graph may include: decomposing the initial computational graph to obtain a plurality of subgraphs; and performing graph transformation processing on the plurality of subgraphs based on a preset subgraph transformation library for at least once, to obtain the target computational graph. That is, for the initial computational graph, optimization is performed at an optimization granularity of the computational graph.

Optionally, in step S103, iterative graph transformation processing may be performed on the initial computational graph in the preset subgraph transformation library for a plurality of times, to obtain a final target computational graph. In step S103, a process in which the data processing apparatus may automatically perform graph transformation processing on the plurality of subgraphs based on the preset subgraph transformation library, to obtain the second DC computational graph may include: performing graph transformation processing on the plurality of subgraphs based on the preset subgraph transformation library and a first parameter, to obtain the second DC computational graph. The first parameter includes at least one of the following: a quantity of transformation times, a transformation duration, data movement overheads, and a cache miss rate. In a process of performing graph transformation on the subgraphs, iterative optimization may be performed in the subgraph transformation graph library for a plurality of times based on different optimization requirements, and different optimization requirements may be determined based on the first parameter. Optionally, the first parameter may be preconfigured in the data processing apparatus, or may be determined in response to an input operation of the user, or may be configured in another manner. This is not limited herein.

In a possible implementation, for the subgraph transformation library used in step S103, the method may further include: obtaining subgraph transformation update information; and then updating the preset subgraph transformation library based on the subgraph transformation update information. That is, the subgraph transformation library may be updated based on expertise or a configuration customized by the user.

In this embodiment, to support DC optimization, a subgraph decomposition and a transformation library are designed in step S103, to decompose a DC computational graph into several subgraphs, and provide several DC optimization manners (represented by subgraph transformations), and the user is supported in customizing and supplementing a subgraph decomposition method and a subgraph transformation library. A purpose of the subgraph decomposition is to divide an original computational graph into several subgraphs, and determine whether the subgraphs meet an applicability matching condition of the subgraph transformations, that is, to find an available optimization manner for the computational graph. The subgraph transformation library provides several subgraph transformation manners, to express a DC optimization method, for example, fusion, tile, and local-storage. In addition, to improve scalability and optimization effects, in step S103, the user is supported in customizing and supplementing a subgraph decomposition method and a subgraph transformation (DC optimization manner) library.

Figure 5:
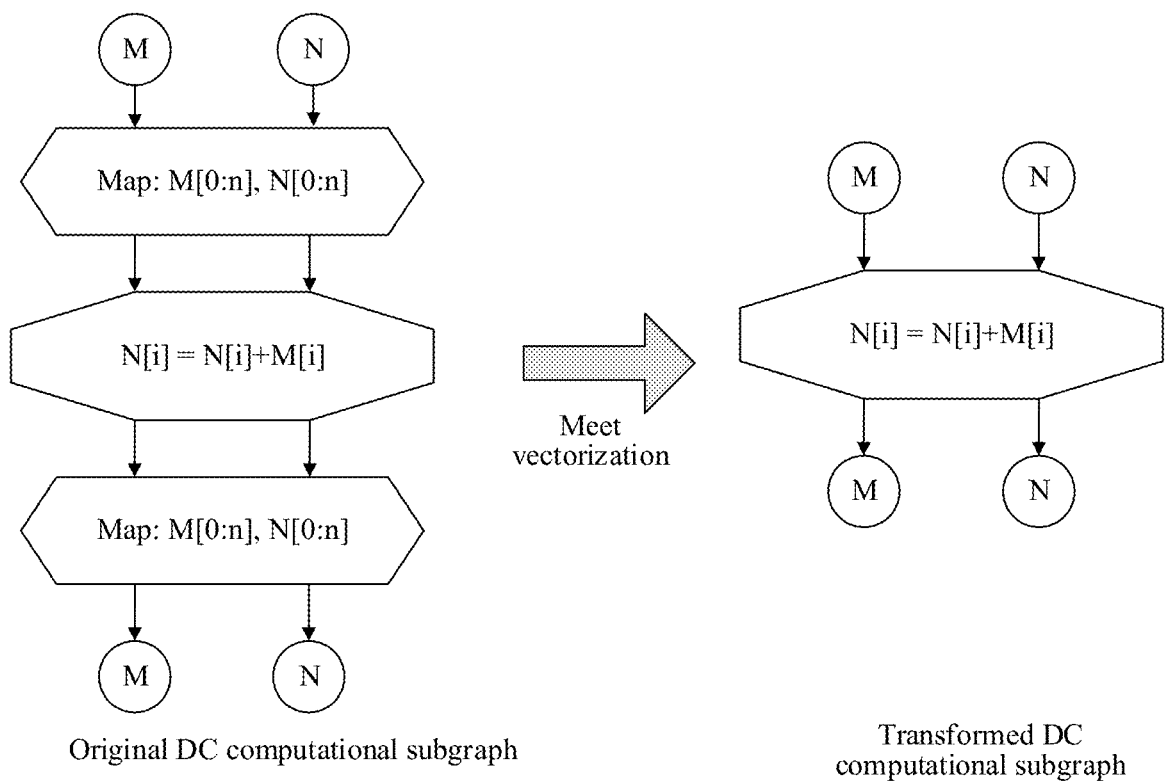
FIG. 5 is another schematic diagram of a data processing method according to an embodiment of this application.

FIG. 5 shows an example in which vectorization (Vectorization) transformation is performed on a DC computational subgraph. An original DC computational subgraph shown in FIG. 5 is an example of a subgraph obtained by performing subgraph decomposition on the initial computational graph. After graph transformation processing is performed in the subgraph transformation library, a transformed DC computational subgraph (that is, an example of the target computational graph) is obtained. In FIG. 5, the DC computational subgraph is input as a one-dimensional vector, a computation operation is bitwise summation, and the subgraph meets vectorization. In this case, a loop mapping process is omitted in the transformed computational subgraph. Specifically, code logic represented by the original DC computational subgraph in FIG. 5 is inputting two one-dimensional vectors (arrays) M and N whose lengths are n, performing an addition operation on the two vectors, and assigning a value to the vector N. It can be learned from FIG. 5 that, in the original DC computational subgraph, loop processing is performed for n times at one level, where each element of M and each element of N are added up and values are assigned to N one by one. Because the original computational subgraph complies with a vectorization instruction supported by a target system structure, after a corresponding transformation manner is determined in the subgraph transformation library and vectorization transformation is performed on the subgraph, it can be learned that a loop operation is omitted in the transformed computational graph, and data of the vectors M and N is directly added up at a time by using the vectorization instruction and copied to N. Further, the transformed computational graph saves n loop processes, which greatly reduces related operations such as memory access, computation, and determining, and instruction invocation.

Further, the following describes a processing process in which after the initial computational graph is optimized at an optimization granularity of the computational graph in step S103 to obtain the target computational graph, because the target computational graph includes an original parameter, that is, a related performance parameter, further tuning may be performed at an optimization granularity of the parameter in step S103. For example, refer to FIG. 3. The transformation module 203 shown in FIG. 2 may include a graph transformation module 2031 and a parameter transformation module 2032.

In a possible implementation, the graph transformation module 2031 is specifically configured to perform graph transformation processing on the initial computational graph for at least once, to obtain a graph-transformed computational graph. The graph-transformed computational graph includes an original parameter. Then, the parameter transformation module 2032 performs parameter transformation processing on the original parameter in code corresponding to the graph-transformed computational graph, to obtain the target computational graph. The transformation module in the data processing apparatus may transform the initial computational graph in different granularities to obtain the target computational graph, that is, after performing optimization by using the computational graph as an optimization granularity to obtain a transformed computational graph, perform optimization at an optimization granularity of a parameter included in the transformed computational graph to obtain the target computational graph. The transformation module completes auto-optimization of the initial computational graph based on two tuning granularities, which can fully improve application performance and reduce system overheads.

Further, a process of optimizing the original parameter in code corresponding to the transformed computational graph, to obtain the target computational graph including the target parameter may include: optimizing the original parameter based on the hardware information of the target device, to obtain the target parameter. The target hardware information indicates the hardware information of the target device, so that the constructed transformed computational graph matches the hardware running environment of the target device, thereby further improving optimization effects.

Figure 6:
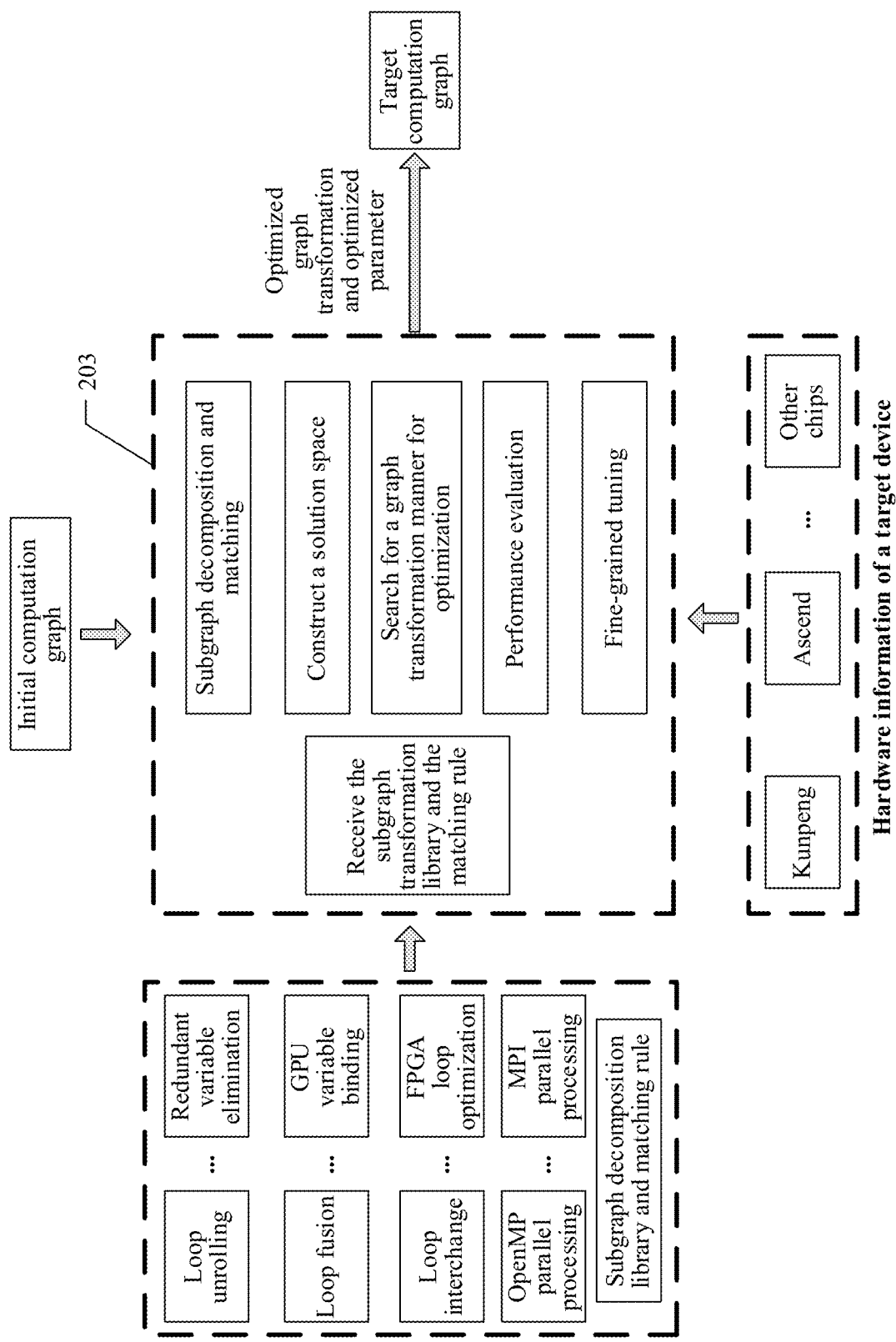
FIG. 6 is another schematic diagram of a data processing method according to an embodiment of this application.

For example, FIG. 6 shows a framework and a procedure of an autotuning module. An input of an autotuning engine (that is, the transformation module 203) is a DC computational graph (that is, the initial computational graph) and hardware information of a target computation system. A subgraph transformation library applicability matching rule may be prestored in the data processing apparatus or obtained from inputting. An output is a target computational graph obtained by combining an optimized graph transformation and an optimized parameter.

In FIG. 6, the subgraph transformation library applicability matching rule may include performing subgraph transformation by redundant variable elimination for loop unrolling, performing subgraph transformation by GPU variable binding for loop fusion, performing subgraph transformation by FPGA loop optimization for loop interchange, and performing subgraph transformation by MPI parallel processing for parallel processing of a multi-threading and parallel programming interface (open Multi-Processing, OpenMP). The autotuning module (that is, the transformation module 203) completes auto-optimization based on two tuning granularities, which first searches for a graph transformation combination for optimization by using the DC computational graph as a granularity, and then fine-grainedly tunes a performance parameter exposed by the graph transformation combination, to fully improve application performance and reduce overheads. An iterative tuning procedure of the DC computational graph is as follows: First, subgraph decomposition and matching are performed on the current DC computational graph. Then, a solution space is constructed based on subgraph decomposition and matching results, and a solution is an available subgraph transformation (DC optimization manner). Finally, a new DC computational graph is generated by searching for, evaluating, and using an optimized subgraph transformation manner, and performance evaluation is performed based on the first parameter indicating an optimization requirement, to complete a plurality of iterations. In addition, the fine-grained parameter tuning part supports a user in using any parameter autotuning method to finally output a target computational graph. The target computational graph includes a combination of an optimized graph transformation and an optimized parameter value.

S104. Generate target application code based on the target computational graph.

In this embodiment, the data processing apparatus further generates the target application code based on the target computational graph obtained after the optimization processing in step S103. The target application code is used to run in the target device.

In step S104, the code generation module 204 in the data processing apparatus 200 shown in FIG. 2 may be used to process the target computational graph obtained by the transformation module 203, to generate the target application code.

Optionally, in step S104, when generating the target application code, the data processing apparatus may further perform processing based on the hardware information of the target device and the transformed computational graph, to obtain the target application code. The target hardware information indicates the hardware information of the target device, so that the generated target application code matches the hardware running environment of the target device, thereby further improving optimization effects.

S105. Output the target application code to the target device.

In this embodiment, in step S105, the data processing apparatus outputs the target application code generated in step S104 to the target device, so that the target device runs an application corresponding to the target application code.

In step S105, the output module 205 in the data processing apparatus 200 shown in FIG. 2 may be used to output the target application code generated by the code generation module 204.

Specifically, when tuning an application, an input of the data processing apparatus is DSL code of an original application and target hardware information, and an output is an optimized application binary oriented to a target system structure. A workflow in a compilation process is as follows: First, multi-level computation IR decomposition is performed on DSL code that is of an original application and that is input by a user, to obtain a DC computational graph. Then, the DC computational graph is decomposed into several subgraphs. Then, the autotuning engine first autotunes the DC computational graph in an optimization manner in a subgraph transformation library, and then fine-grainedly tunes a related parameter exposed in the graph transformation manner, to obtain an optimal combination of a graph transformation and a parameter value. Finally, target code is generated for an optimized computational graph, and is compiled to output an application binary.

Figure 7A:
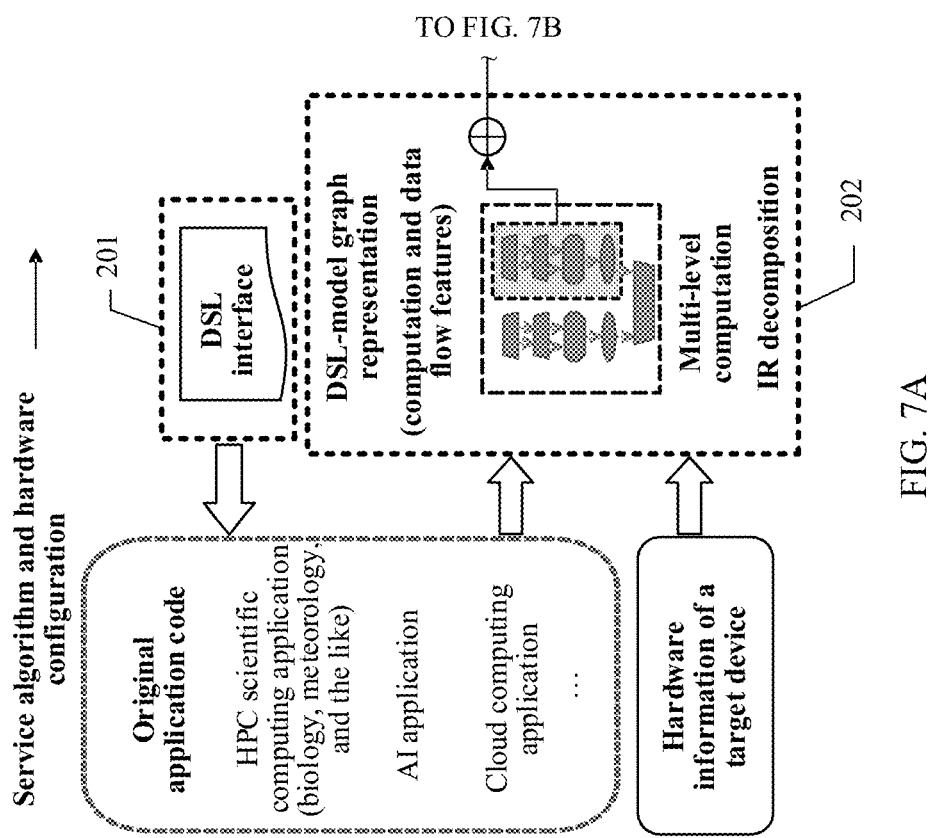
FIG. 7A and FIG. 7B are another schematic diagram of a data processing method according to an embodiment of this application.
Figure 7B:
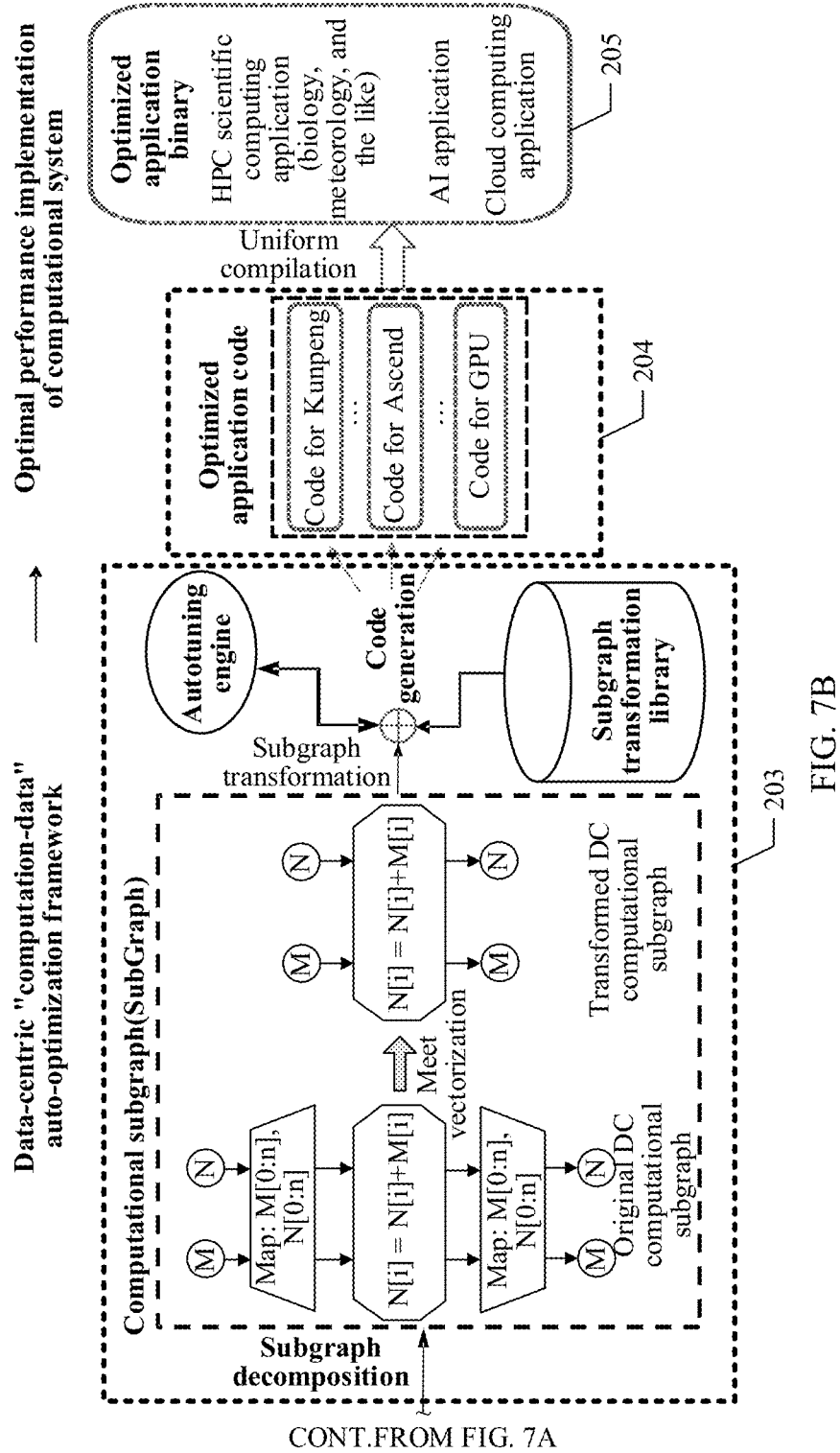

FIG. 7A and FIG. 7B are a schematic diagram of a framework to which a data processing method is applied according to an embodiment of this application. The framework is specifically a data-centric "computation-data" auto-optimization framework. The framework is configured to optimize input information such as a service algorithm and a hardware configuration, so that optimal performance of a computation system is implemented. The implementation framework shown in FIG. 7A and FIG. 7B includes the following implementation process:

The input module (that is, a DSL interface in the FIG. 201 is configured to obtain original application code and hardware information.

The multi-level IR decomposition module 202 is configured to perform multi-level computation IR decomposition on the original application code to obtain an initial computational graph represented by a DSL-Model graph.

The transformation module 203 is configured to perform subgraph decomposition on the initial computational graph to obtain computational subgraphs (SubGraphs), and then perform subgraph transformation based on an autotuning engine and a subgraph transformation library to obtain a target computational graph.

The code generation module 204 is configured to perform code generation based on the target computational graph to obtain target application code. The target application code may be different code obtained based on different hardware, for example, one or more of target application code applicable to running on a Kunpeng chip (Code for Kunpeng), target application code applicable to running on an Ascend chip (Code for Ascend), and target application code applicable to running on a GPU (Code for GPU).

The output module 205 is configured to output the target application code to a target device, so that the target device uniformly compiles the target application code, to obtain and run optimized application binary code. In this way, the original application code runs in different systems and performance portability is implemented. Compared with a manner of manually selecting and implementing a transformation by a user, optimization effects and efficiency of an application tuning process are improved.

Figure 8:
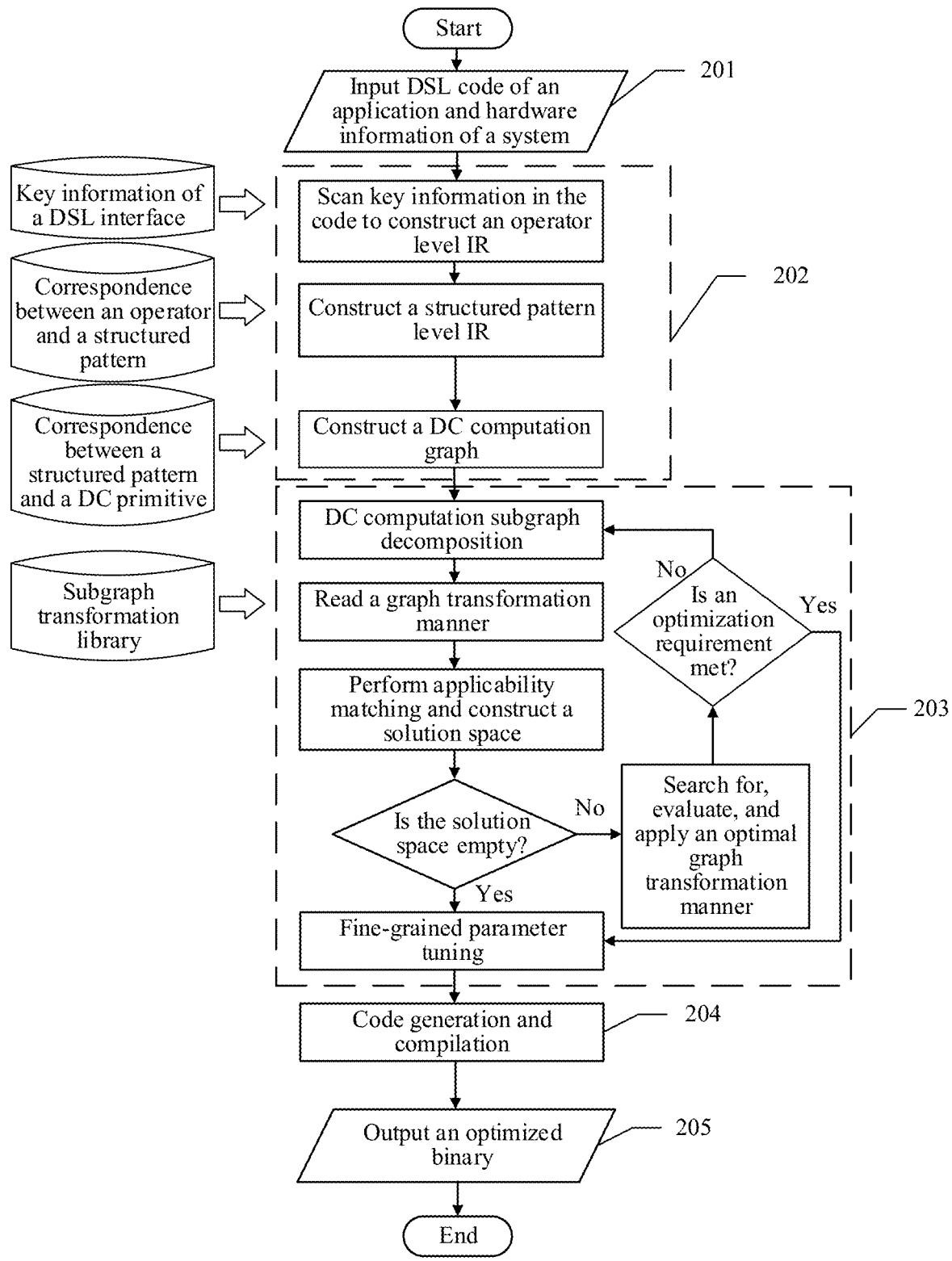
FIG. 8 is another schematic diagram of a data processing method according to an embodiment of this application.

FIG. 8 is a specific application instance of an embodiment of this application based on the implementation processes shown in FIG. 4 to FIG. 7A and FIG. 7B. FIG. 8 includes the following workflow.

In the input module 201, an input is DSL code of an application (that is, original application code) and hardware information of a system. The application may be any HPC application, cloud computing application, or AI application. The hardware information includes a CPU core quantity, a CPU frequency, a capacity of each level of cache, a vectorization length, a memory size, a GPU memory capacity, and the like.

In the multi-level IR decomposition module 202, key information in the DSL code of the application is first scanned and analyzed based on key information of a DSL interface, to construct an operator level IR. Then, a correspondence between an operator and a structured pattern is selected based on the hardware information of the system, to construct a structured pattern level IR. Then, a DC computational graph (that is, an initial computational graph) is constructed based on a correspondence between a structured pattern and a DC primitive.

In the transformation module 203, the DC computational graph and a parameter of the DC computational graph are autotuned, and a combination of a graph transformation manner for optimization and a parameter is provided.

Specifically, the current DC computational graph is first decomposed to generate several computational subgraphs. Then, a graph transformation manner in a subgraph transformation library is read. Next, applicability matching is performed on the DC computational subgraphs based on the graph transformation manner, to search for an available graph transformation manner for the DC computational subgraphs, and a solution space is constructed. Then, it is determined whether the current solution space is empty, that is, it is determined whether all DC computational subgraphs have no available graph transformation manner.

If the current solution space is not empty, an optimal graph transformation manner is searched for and evaluated in the solution space, and the current DC computational graph is transformed. When it is determined that the current computational graph meets an optimization requirement, a fine-grained tuning process is performed. When it is determined that the current computational graph does not meet the optimization requirement, subgraph decomposition and solution space processing are iteratively performed.

If the current solution space is empty, fine-grained tuning is performed, that is, with reference to the hardware information of the target system, autotuning is performed on a performance parameter exposed in the currently used graph transformation manner, to obtain a target computational graph.

In the code generation module 204, target code is generated based on the target computational graph obtained by combining the graph transformation manner for optimization and the parameter in the transformation module 203, and is compiled to generate a binary.

In the output module 205, the optimized application binary is output to a target device.

It should be noted as follows:
(1) In FIG. 8, the DSL interface, the correspondence between an operator and a structured pattern, the correspondence between a structured pattern and a DC primitive that are used in the multi-level IR decomposition module 202, and the subgraph transformation library used in the transformation module 203 all support user customization and supplementation.
(2) In the transformation module 203, by default, a determining condition of determining whether the optimization requirement is met is determining whether a specified quantity of iterations is met (for example, determining whether 30 iterations are performed). The determining condition supports user modification, and may be but is not limited to an application execution time, data movement overheads, a cache miss rate, and the like.
(3) In the transformation module 203, if the current solution space is not empty, search and evaluation manners to be used support user customization and replacement. For example, a solution (a graph transformation manner available to the subgraphs) may be evaluated in a full-space search and actual measurement manner.

In addition, in the transformation module 203, an extensible framework for program autotuning (an extensible framework for program autotuning, OpenTuner) may be used to autotune the performance parameter, and a user may be supported in using another parameter autotuning method. For example, a vector length may be adjusted by ACCTuner, and Stencil computation may be adjusted by FAST.

In conclusion, the data processing apparatus and method that are provided in embodiments of this application support DC auto-optimization applied to a wide range of computing fields, implement application performance portability, improve application performance, reduce power consumption overheads, lower an optimization threshold, and improve optimization efficiency. In addition, compared with a conventional application tuning method, a DC optimization process does not need to be manually completed by a user by accumulating and using optimization experience, thereby improving optimization efficiency. In addition, a DC computational graph can be auto-optimized in different granularities, rather than only parameter tuning, and user experience is not required. Further, a DSL interface that performs high-level abstraction is further provided, which can be used in a wide range of computing fields to perform multi-level computation IR decomposition on DSL source code, to extract more abundant computation and data flow features, thereby implementing DC auto-optimization, and improving optimization effects and efficiency. Innovations and benefits of technical points are as follows:
(1) DSL Interface that Performs High-Level Abstraction and is Close to Mathematical Expressions:

By analyzing and summarizing common mathematical operators and data structures in a wide range of computing fields, a DSL interface that performs high-level abstraction and is close to mathematical expressions are designed and provided, including a mathematical equation operator (a differential equation, LU decomposition, or the like), geometric discrete abstraction, a typical data structure (a vector, a matrix, or the like), a DC primitive, and the like. Compared with a conventional technology, the DSL interface provided in the present invention performs high-level abstraction on computation and data flows of applications, and is close to mathematical expression manners of the applications, which improves user programming efficiency, supports expressions of computing applications in a wide range of fields, and has a wide application scope.
(2) Multi-Level Computation IR Decomposition:

The present invention innovatively divides a computing application IR into three levels: an operator pattern level, a structured pattern level, and a DC level, and this idea is embedded in DSL design. Compared with a conventional technology, in the present invention, keyword information of DSL code of an application is scanned, and with reference to a conversion relationship between levels of IRs that is constructed based on expert experience and hardware information, the application is decomposed level by level into IRs that are at the three levels and that are preliminarily optimized, so that an algorithm is separated from optimization, and more abundant computation and data flow features, for example, a computing equation operator, a communication mode, a computing mode, and a data flow, are captured.
(3) DC Autotuning Engine:

In the present invention, first, by using a graph transformation as a granularity, a subgraph transformation combination for optimization is automatically selected by constructing a solution space and iteratively searching for, evaluating, and applying a graph transformation manner for optimization, and then a performance parameter exposed by graph transformation is autotuned fine-grainedly. Compared with a conventional technology, the present invention implements DC auto-optimization and autotuning of a related parameter, and user experience is not required, thereby saving a process of manually selecting a graph transformation by a user, implementing performance portability, and improving optimization efficiency, while implementing applicability to computing applications in a wide range of fields, and having a wide application scope.

The foregoing describes embodiments of this application from the perspective of method, and the following further describes embodiments of this application from the perspective of apparatus.

Figure 9:
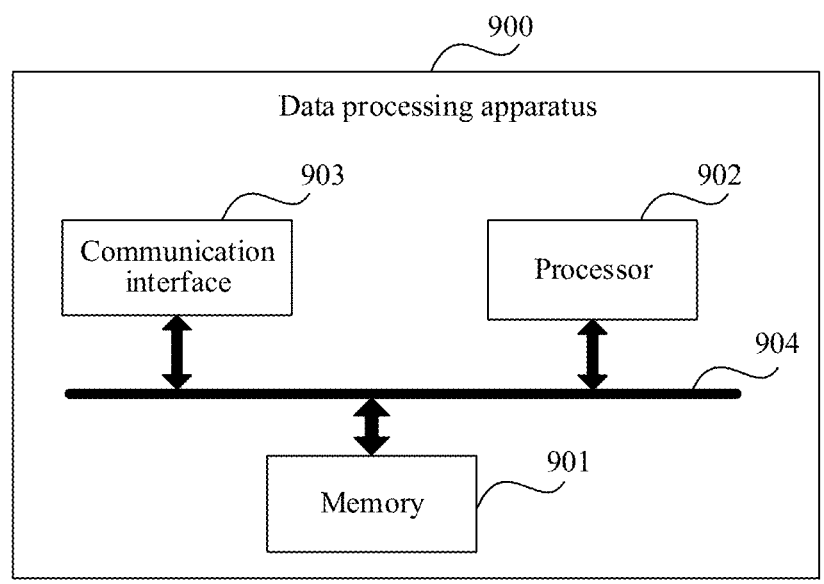
FIG. 9 is another schematic diagram of a data processing apparatus according to an embodiment of this application.

FIG. 9 is a schematic diagram of a hardware structure of a data processing apparatus according to an embodiment of this application. The data processing apparatus 900 (the apparatus 900 may be specifically a computer device) shown in FIG. 9 includes a memory 901, a processor 902, a communication interface 903, and a bus 904. The memory 901, the processor 902, and the communication interface 903 implement a communication connection to each other through the bus 904.

The memory 901 may be a read-only memory (read-only memory, ROM), a static storage device, a dynamic storage device, or a random access memory (random access memory, RAM). The memory 901 may store a program. When the program stored in the memory 901 is executed by the processor 902, the processor 902 and the communication interface 903 are configured to perform steps of the data processing method in embodiments of this application.

The processor 902 may be a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, to implement functions to be performed by units in the data processing apparatus in embodiments of this application, or perform the model processing method in the method embodiments of this application.

Alternatively, the processor 902 may be an integrated circuit chip, and has a signal processing capability. In an implementation process, steps of the model processing method may be implemented by using a hardware integrated logical circuit in the processor 902 or instructions in a form of software. The processor 902 may be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The processor may implement or execute methods, steps, and logical block diagrams disclosed in embodiments of this application. The general-purpose processor may be a microprocessor, or the processor may be any conventional processor or the like. Steps of the method disclosed with reference to embodiments of this application may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 901. The processor 902 reads information in the memory 901, and completes, in combination with hardware of the processor, functions to be performed by units included in the data processing apparatus in embodiments of this application, or performs the model processing method in the method embodiments of this application.

The communication interface 903 uses a transceiver apparatus, for example but not limited to a transceiver, to implement communication between the apparatus 900 and another device or a communication network. For example, training data (for example, the training image in embodiments of this application) may be obtained by using the communication interface 903.

The bus 904 may include a path through which information is transmitted between components (for example, the memory 901, the processor 902, and the communication interface 903) of the apparatus 900.

It should be noted that although the apparatus 900 shown in FIG. 9 shows only the memory, the processor, and the communication interface, in a specific implementation process, persons skilled in the art should understand that the apparatus 900 further includes another component necessary for normal operation. In addition, depending on specific requirements, persons skilled in the art should understand that the apparatus 900 may further include a hardware component for implementing another additional function. In addition, persons skilled in the art should understand that the apparatus 900 may alternatively include only components necessary for implementing embodiments of this application, but does not need to include all the components shown in FIG. 9.

It should be noted that the data processing apparatus shown in FIG. 9 may be specifically configured to implement steps implemented by the data processing apparatus in the foregoing method embodiment, and implement technical effects corresponding to the data processing apparatus. For a specific implementation of the data processing apparatus shown in FIG. 9, refer to the description in the foregoing method embodiment. Details are not described herein again.

Figure 10:
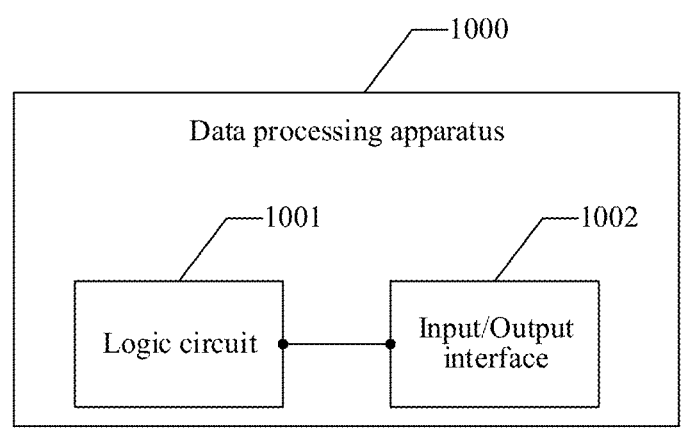
FIG. 10 is another schematic diagram of a data processing apparatus according to an embodiment of this application.

FIG. 10 is another schematic diagram of a structure of a data processing apparatus according to this application. The data processing apparatus 1000 includes a logic circuit 1001 and an input/output interface 1002. The data processing apparatus 1000 may be a chip or an integrated circuit.

The communication interface 903 shown in FIG. 9 may be the input/output interface 1002 in FIG. 10, and the input/output interface 1002 may include an input interface and an output interface. Alternatively, the communication interface may be a transceiver circuit, and the transceiver circuit may include an input interface circuit and an output interface circuit. In addition, the processor 902 shown in FIG. 9 may be the logic circuit 1001 in FIG. 10.

Specifically, the input/output interface 1002 is configured to obtain original application code. The logic circuit 1001 is configured to process the original application code to obtain target application code, and output the target application code through the input/output interface 1002.

In a possible implementation, the logic circuit 1001 may further perform another step performed by the processor 902, and implement corresponding advantageous effect. The input/output interface 1002 may further perform another step performed by the communication interface 903, and implement corresponding advantageous effect. Details are not described herein again.

In a possible implementation, the logic circuit 1001 may be a processing apparatus, and some or all functions of the processing apparatus may be implemented by using software.

Optionally, the processing apparatus may include a memory and a processor. The memory is configured to store a computer program. The processor reads and executes the computer program stored in the memory, to perform corresponding processing and/or steps in any method embodiment.

Optionally, the processing apparatus may include only the processor. The memory configured to store the computer program is located outside the processing apparatus, and the processor is connected to the memory by using a circuit/wire, to read and execute the computer program stored in the memory. The memory and the processor may be integrated, or may be physically independent of each other.

Optionally, the processing apparatus may be one or more chips, or one or more integrated circuits. For example, the processing apparatus may be one or more field-programmable gate arrays (field-programmable gate arrays, FPGAs), application-specific integrated circuits (application-specific integrated circuits, ASICs), system on chips (system on chips, SoCs), central processing units (central processing units, CPUs), network processors (network processors, NPs), digital signal processors (digital signal processors, DSPs), micro controller units (micro controller units, MCUs), programmable logic devices (programmable logic devices, PLDs), or other integrated chips, or any combination of the chips or processors.

An embodiment of this application further provides a computer-readable storage medium storing one or more computer-executable instructions. When the computer-executable instructions are executed by a processor, the processor performs the method in the possible implementations of the data processing apparatus in the foregoing embodiments.

An embodiment of this application further provides a computer program product (or referred to as a computer program) that stores one or more computer instructions. When the computer program product is executed by the processor, the processor performs the method in the possible implementations of the data processing apparatus.

An embodiment of this application further provides a chip system. The chip system includes at least one processor, configured to support a terminal device in implementing functions in the possible implementations of the data processing apparatus. Optionally, the chip system further includes an interface circuit, and the interface circuit provides program instructions and/or data for the at least one processor. In a possible design, the chip system may further include a memory. The memory is configured to store program instructions and data that are necessary for the terminal device. The chip system may include a chip, or may include a chip and another discrete component.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one place, or may be distributed on a plurality of network units. Some or all of the units may be selected depending on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit. When the integrated unit is implemented in the form of the software functional unit and sold or used as an independent product, the integrated unit may be stored in a computer-readable storage medium. Based on such an understanding, technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The storage medium includes various media that can store program code, such as a USB flash drive, a removable hard disk, a read-only memory (ROM, Read-Only Memory), a random access memory (RAM, Random Access Memory), a magnetic disk, or an optical disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A system, comprising:
    a target device; and
    a data processing apparatus configured to:
        obtain original application code;
        decompose the original application code into a plurality of levels of intermediate representations (IRs);
        determine an initial computational graph based on the plurality of levels of IRs;
        transform the initial computational graph at different granularities to obtain a target computational graph;
        generate target application code based on the target computational graph; and
        output the target application code to the target device;
    wherein the target device is configured to execute the target application code;
    wherein the data processing apparatus decomposing the original application code into the plurality of levels of IRs comprises:
        the data processing apparatus decomposing a first-level IR to determine a first IR based on the original application code, wherein the first IR comprises a plurality of operators;
        the data processing apparatus decomposing a second-level IR to construct a second IR based on the first IR, wherein the second IR comprises a structured pattern corresponding to the plurality of operators of the first IR; and
        the data processing apparatus decomposing a third-level IR to determine a third IR based on the second IR, a data-centric (DC) primitive corresponding to the structured pattern of the second IR, wherein the DC primitive is used to construct the initial computational graph.

2. The system according to claim 1, wherein the data processing apparatus transforming the initial computational graph comprises:
    the data processing apparatus performing the graph transformation processing on the initial computational graph to obtain a graph-transformed computational graph, wherein the graph-transformed computational graph comprises an original parameter; and
    the data processing apparatus performing parameter transformation processing on the original parameter in code corresponding to the graph-transformed computational graph, to obtain the target computational graph.

3. The system according to claim 2, wherein the data processing apparatus performing the parameter transformation processing on the original parameter in the code corresponding to the graph-transformed computational graph, to obtain the target computational graph, comprises:
    the data processing apparatus performing, based on hardware information of the target device, parameter transformation processing on the original parameter in the code corresponding to the graph-transformed computational graph, to obtain the target computational graph.

4. The system according to claim 1, wherein the data processing apparatus constructing the second IR based on the first IR comprises:
    the data processing apparatus constructing the second IR based on the first IR and hardware information of the target device.

5. The system according to claim 1, wherein the data processing apparatus transforming the initial computational graph comprises:

the data processing apparatus decomposing the initial computational graph to obtain a plurality of subgraphs; and the data processing apparatus performing graph transformation processing on the plurality of subgraphs based on a preset subgraph transformation library once, to obtain the target computational graph.

6. The system according to claim 5, wherein the data processing apparatus performing the graph transformation processing on the plurality of subgraphs based on the preset subgraph transformation library, to obtain the target computational graph, comprises:

based on the preset subgraph transformation library and a first parameter, the data processing apparatus performing graph transformation processing on the plurality of subgraphs, to obtain the target computational graph, wherein the first parameter comprises at least one of the following: a quantity of transformation times, a transformation duration, data movement overheads, or a cache miss rate.

7. The system according to claim 5, wherein the data processing apparatus is further configured to:

obtain subgraph transformation update information; and update the preset subgraph transformation library based on the subgraph transformation update information.

8. The system according to claim 1, wherein the original application code comprises at least one of the following: a mathematical equation operator, geometric discrete abstraction, a typical data structure, or a DC primitive.

9. The system according to claim 1, wherein the plurality of operators comprises at least one of the following: a mathematical equation-based operator decomposition, a geometric discrete abstraction, or a basic data type.

10. The system according to claim 1, wherein the structured pattern comprises at least one of the following: a Stencil pattern, a Reduce pattern, or a Package pattern.

11. The system according to claim 1, wherein the initial computational graph comprises at least one of the following: data, data movement, a computation task, or loop mapping.

12. A computer-implemented method, comprising:

obtaining, by a data processing apparatus, original application code;

decomposing, by the data processing apparatus, the original application code into a plurality of levels of intermediate representations (IRs), and determining an initial computational graph based on the plurality of levels of IRs;

transforming, by the data processing apparatus, the initial computational graph at different granularities to obtain a target computational graph;

generating, by the data processing apparatus, target application code based on the target computational graph;

outputting, by the data processing apparatus, the target application code to a target device; and executing, by the target device, the target application code;

wherein the data processing apparatus decomposing the original application code into the plurality of levels of IRs comprises:

the data processing apparatus decomposing a first-level IR to determine a first IR based on the original application code, wherein the first IR comprises a plurality of operators;

the data processing apparatus decomposing a second-level IR to construct a second IR based on the first IR, wherein the second IR comprises a structured pattern corresponding to the plurality of operators of the first IR; and the data processing apparatus decomposing a third-level IR to determine a third IR based on the second IR, a data-centric (DC) primitive corresponding to the structured pattern of the second IR, wherein the DC primitive is used to construct the initial computational graph.

13. The method according to claim 12, wherein the data processing apparatus transforming the initial computational graph comprises:

the data processing apparatus performing graph transformation processing on the initial computational graph, to obtain a graph-transformed computational graph, wherein the graph-transformed computational graph comprises an original parameter; and the data processing apparatus performing parameter transformation processing on the original parameter in code corresponding to the graph-transformed computational graph, to obtain the target computational graph.

14. The method according to claim 13, wherein the data processing apparatus performing the parameter transformation processing on the original parameter in the code corresponding to the graph-transformed computational graph, to obtain the target computational graph, comprises:

the data processing apparatus performing, based on hardware information of the target device, parameter transformation processing on the original parameter in the code corresponding to the graph-transformed computational graph, to obtain the target computational graph.

15. The method according to claim 12, wherein the data processing apparatus constructing the second IR based on the first IR comprises:

the data processing apparatus constructing the second IR based on the first IR and the hardware information of the target device.

16. The method according to claim 12, wherein the data processing apparatus transforming the initial computational graph comprises:

the data processing apparatus decomposing the initial computational graph to obtain a plurality of subgraphs; and the data processing apparatus performing graph transformation processing on the plurality of subgraphs based on a preset subgraph transformation library once, to obtain the target computational graph.

17. The method according to claim 16, wherein the data processing apparatus performing the graph transformation processing on the plurality of subgraphs based on the preset subgraph transformation library, to obtain the target computational graph, comprises:

based on the preset subgraph transformation library and a first parameter, the data processing apparatus performing graph transformation processing on the plurality of subgraphs, to obtain the target computational graph, wherein the first parameter comprises at least one of the following: a quantity of transformation times, a transformation duration, data movement overheads, and a cache miss rate.

18. The method according to claim 16, further comprising:

the data processing apparatus obtaining subgraph transformation update information; and the data processing apparatus updating the preset subgraph transformation library based on the subgraph transformation update information.

19. One or more non-transitory computer-readable mediums having processor-executable instructions stored thereon, wherein the processor-executable instructions, when executed, facilitate performance of the following:
   obtaining, by a data processing apparatus, original application code;
   decomposing, by the data processing apparatus, the original application code into a plurality of levels of intermediate representations (IRs), and determining an initial computational graph based on the plurality of levels of IRs;
   transforming, by the data processing apparatus, the initial computational graph at different granularities to obtain a target computational graph;
   generating, by the data processing apparatus, target application code based on the target computational graph;
   outputting, by the data processing apparatus, the target application code to a target device; and
   executing, by the target device, the target application code;
   wherein the data processing apparatus decomposing the original application code into the plurality of levels of IRs comprises:
      the data processing apparatus decomposing a first-level IR determine a first IR based on the original application code, wherein the first IR comprises a plurality of operators;
      the data processing apparatus decomposing a second-level IR to construct a second IR based on the first IR, wherein the second IR comprises a structured pattern corresponding to the plurality of operators of the first IR; and
      the data processing apparatus decomposing a third-level IR to determine a third IR based on the second IR, a data-centric (DC) primitive corresponding to the structured pattern of the second IR, wherein the DC primitive is used to construct the initial computational graph.

20. The one or more non-transitory computer-readable mediums according to claim 19, wherein the data processing apparatus transforming the initial computational graph comprises:
   the data processing apparatus performing graph transformation processing on the initial computational graph, to obtain a graph-transformed computational graph, wherein the graph-transformed computational graph comprises an original parameter; and
   the data processing apparatus performing parameter transformation processing on the original parameter in code corresponding to the graph-transformed computational graph, to obtain the target computational graph.

* * * * *